United States Patent [19]

Jewess

[11] Patent Number: 5,004,074
[45] Date of Patent: Apr. 2, 1991

[54] OVERFILL FILLER PIPE ASSEMBLY

[75] Inventor: Gordon Jewess, San Diego, Calif.

[73] Assignee: Sundstrand Corporation, Rockford, Ill.

[21] Appl. No.: 460,305

[22] Filed: Jan. 3, 1990

[51] Int. Cl.$^5$ .............................................. F16N 21/00
[52] U.S. Cl. ............................... 184/105.1; 220/85 F; 220/86.2; 241/86
[58] Field of Search ................... 184/6.12, 88.1, 103.1, 184/105.1; 220/85 F, 85 SP, 85 S, 86 R, 86.2; 222/108; 141/86, 88, 324, 340, 391, 392

[56] References Cited

U.S. PATENT DOCUMENTS

| | | | |
|---|---|---|---|
| 3,377,708 | 4/1968 | Gassman et al. | 33/126.7 |
| 3,467,274 | 9/1969 | Schmitt | 220/86 |
| 3,543,484 | 12/1970 | Davis | 55/387 |
| 4,082,163 | 4/1978 | Takeishi | 184/105 R |
| 4,155,167 | 5/1979 | DeLano | 33/126.7 R |
| 4,701,198 | 10/1987 | Uranishi et al. | 55/387 |
| 4,722,454 | 2/1988 | Fischer | 220/85 R |
| 4,762,247 | 8/1988 | Temmesfeld | 220/303 |

FOREIGN PATENT DOCUMENTS 915862  1/1963  United Kingdom .

*Primary Examiner*—Ira S. Lazarus
*Assistant Examiner*—Alan B. Cariuso
*Attorney, Agent, or Firm*—Wood, Phillips, Mason, Recktenwald & Van Santen

[57] ABSTRACT

In order to avoid a liquid overfill condition and detect a maximum liquid level in a liquid containing reservoir 12, a filler pipe assembly 10 is provided in which an elongated filler pipe 14 has one end 16 integral with the liquid containing reservoir 12 and the other end 18 remote from the liquid containing reservoir 12. The elongated filler pipe 14 has a liquid-supplying opening 20 at the end 16 thereof integral with the liquid containing reservoir 12 and a liquid-receiving opening 22 at the end 18 thereof remote from the liquid containing reservoir 12. It also includes a liquid passageway 24 extending between the liquid-receiving opening 22 and the liquid-supplying opening 20. The elongated filler pipe 14 is adapted to receive liquid in the liquid-receiving opening 22 and direct liquid along the liquid passageway 24 and into the liquid containing reservoir 12 as it exits the liquid-supplying opening 20. The assembly 10 still further includes a one-way barrier 26 positioned relative to an overfill opening 28 in the elongated filler pipe 14 at a point remote from the liquid-receiving opening 22. With this arrangement, the barrier 26 directs liquid introduced at the liquid-receiving opening 22 past the overfill opening 28 and into the liquid containing reservoir 12 while allowing liquid in the liquid containing reservoir 12 to escape through the overfill opening 28 in the event of introduction of liquid in a quantity sufficient to reach the overfill opening 28 in a liquid overfill condition.

20 Claims, 2 Drawing Sheets

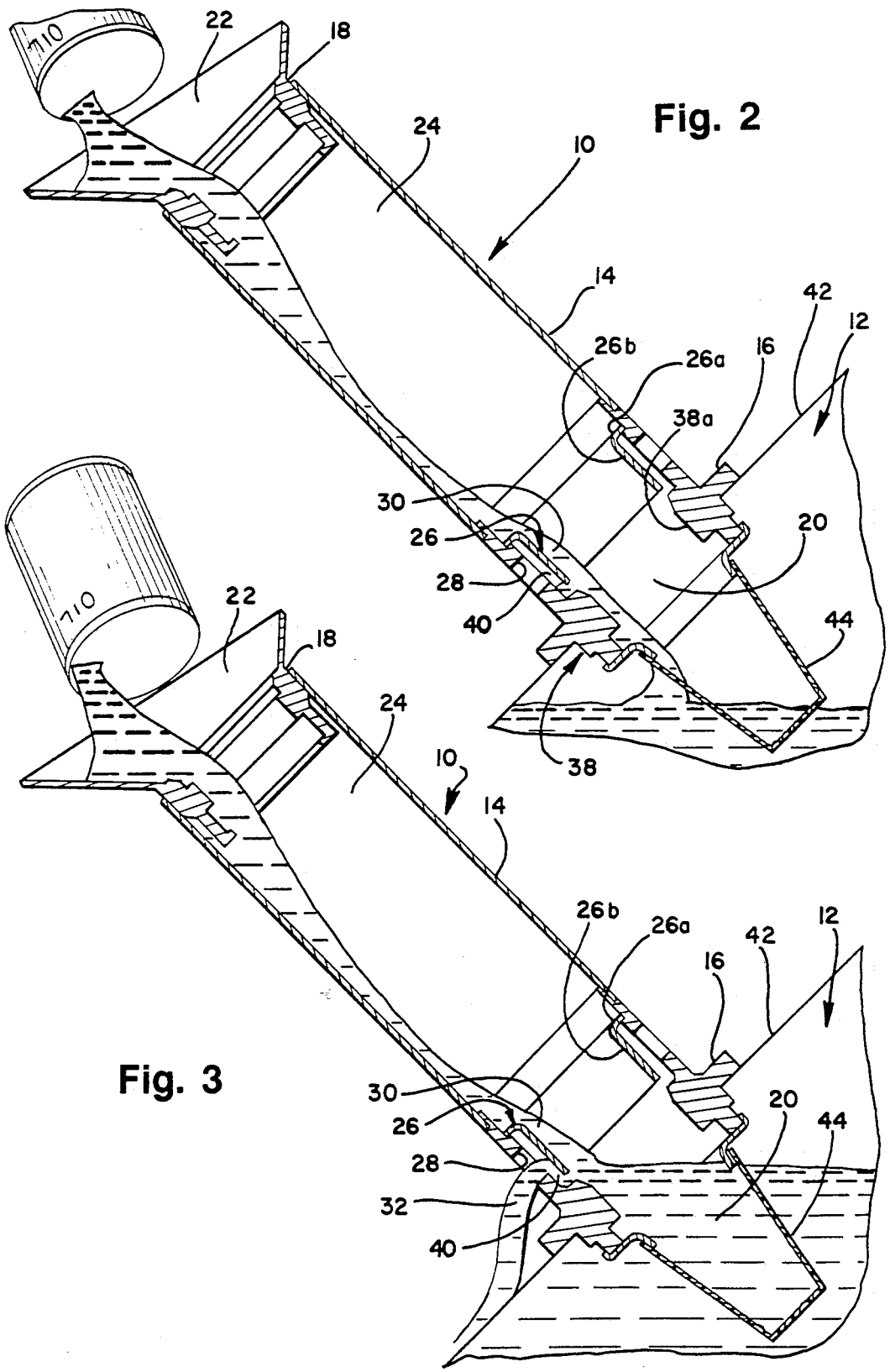

OVERFILL FILLER PIPE ASSEMBLY

FIELD OF THE INVENTION

The present invention is directed generally to a filler pipe assembly and, more particularly, to a filler pipe assembly having a liquid overfill opening therein.

BACKGROUND OF THE INVENTION

In many instances, it is necessary to periodically add a liquid to a liquid containing reservoir of one type or another. It is quite common for a filler pipe assembly to be provided for this purpose wherein the filler pipe assembly is integral with the liquid containing reservoir and extends some distance therefrom. Generally speaking, this is a requirement due to the remote placement that is necessary for the liquid containing reservoir.

By way of example, the liquid containing reservoir may comprise a gear box arrangement. This gear box arrangement will generally be such as to require periodic adding of oil by service personnel and, due to its remote location, it is usually necessary to periodically check the oil level during filling by means of a dipstick or the like. However, repeated checking of the dipstick is less than a truly satisfactory method of dealing with the problem.

More specifically, this method of determining the oil level during filling of a gear box requires a great deal of time for the service personnel employed for this purpose. This is, of course, undesirable since it increases maintenance costs and the time required to adequately service an extensive line of equipment. Still further, it increases the likelihood of an overfill condition where equipment serviced may be damaged due to excessive oil pressure or the like.

For certain applications such as commercial aircraft, this is an entirely unacceptable possibility for obvious reasons. Any damage that might occur due to an overfill condition could result not only in damage to key operating components but could also pose a substantial safety hazard. As a result, it is necessary to be able to ensure accuracy in the level of oil in a gear box while finding a way to shorten maintenance time.

The present invention is directed to overcoming the above stated problems and accomplishing the stated objects.

SUMMARY OF THE INVENTION

It is the principal object of the present invention to provide a new and improved filler pipe assembly. More specifically, it is an object of the invention to provide a filler pipe assembly having an overfill opening for escape of liquid in the event of an overfill condition. It is likewise an object of the invention to provide a filler pipe assembly wherein the overfill opening is positioned at a maximum desired level for oil in a gear box.

An exemplary embodiment of the invention achieves the foregoing objects in a filler pipe assembly for a liquid containing reservoir. The assembly includes an elongated filler pipe having one end integral with the liquid containing reservoir and the other end remote from the liquid containing reservoir. The elongated filler pipe has a liquid-receiving opening at the end thereof remote from the liquid containing reservoir and a liquid-supplying opening at the end thereof integral with the liquid containing reservoir. In addition, the elongated filler pipe includes a liquid passageway extending between the liquid-receiving opening and the liquid-supplying opening.

With this arrangement, the elongated filler pipe is adapted to receive liquid in the liquid-receiving opening and direct liquid along the liquid passageway and into the liquid containing reservoir as it exists through the liquid-supplying opening. The assembly also includes a one-way barrier positioned relative to an overfill opening in the elongated filler pipe at a point remote from the liquid-receiving opening and preferably adjacent or near the liquid-supplying opening to direct liquid introduced at the liquid-receiving opening past the overfill opening and into the liquid containing reservoir. At the same time, the one-way barrier allows liquid in the liquid containing reservoir to escape through the overfill opening in the event of introduction of liquid in a quantity sufficient to reach the overfill opening in an overfill condition.

In the exemplary embodiment, the elongated filler pipe is generally tubular shaped and disposed in an inclined plane. The overfill opening is then advantageously disposed at a lowermost point along the liquid passageway adjacent the liquid-supplying opening. In addition, the one-way barrier suitably comprises an internal flange integral with the elongated filler pipe.

More specifically, the internal flange preferably directs liquid introduced into the liquid-receiving opening over or past the overfill opening It includes a radially inwardly extending portion above the overfill opening which preferably extends substantially entirely about the liquid passageway and inwardly only a short distance. In addition, the internal flange preferably includes a skirt portion depending from the radially extending portion substantially entirely about the liquid passageway.

In a highly preferred embodiment, the filler pipe assembly is an oil filler pipe for a gear box of the type found on commercial aircrafts. Advantageously, the overfill opening is disposed precisely at the point of a desired maximum oil level for the gear box. In this manner, the gear box can be filled with oil until visual detection of oil passing through the overfill opening to indicate an overfill condition.

Other details of the present invention may include a cap removably securable to the elongated filler pipe at the oil-receiving opening. Also, the skirt portion of the internal flange preferably extends to a point at or below the oil overfill opening in order to ensure that oil introduced into the elongated filler pipe is directed over the oil overfill opening. Further, the skirt portion preferably defines a reduced diameter region of the oil passageway for directing oil into the oil-supplying opening.

Other objects, advantages and features will become apparent from the following specification taken in conjunction with the accompanying drawings.

BRIEF DESCRIPTION OF THE DRAWINGS

FIG. 2 is a cross-sectional view similar to FIG. 1 illustrating a liquid being introduced into the filler pipe assembly; and FIG. 3 is a cross-sectional view similar to FIG. 1 illustrating a liquid overfill condition in the filler pipe assembly.

DETAILED DESCRIPTION OF THE PREFERRED EMBODIMENT

Figure 1:
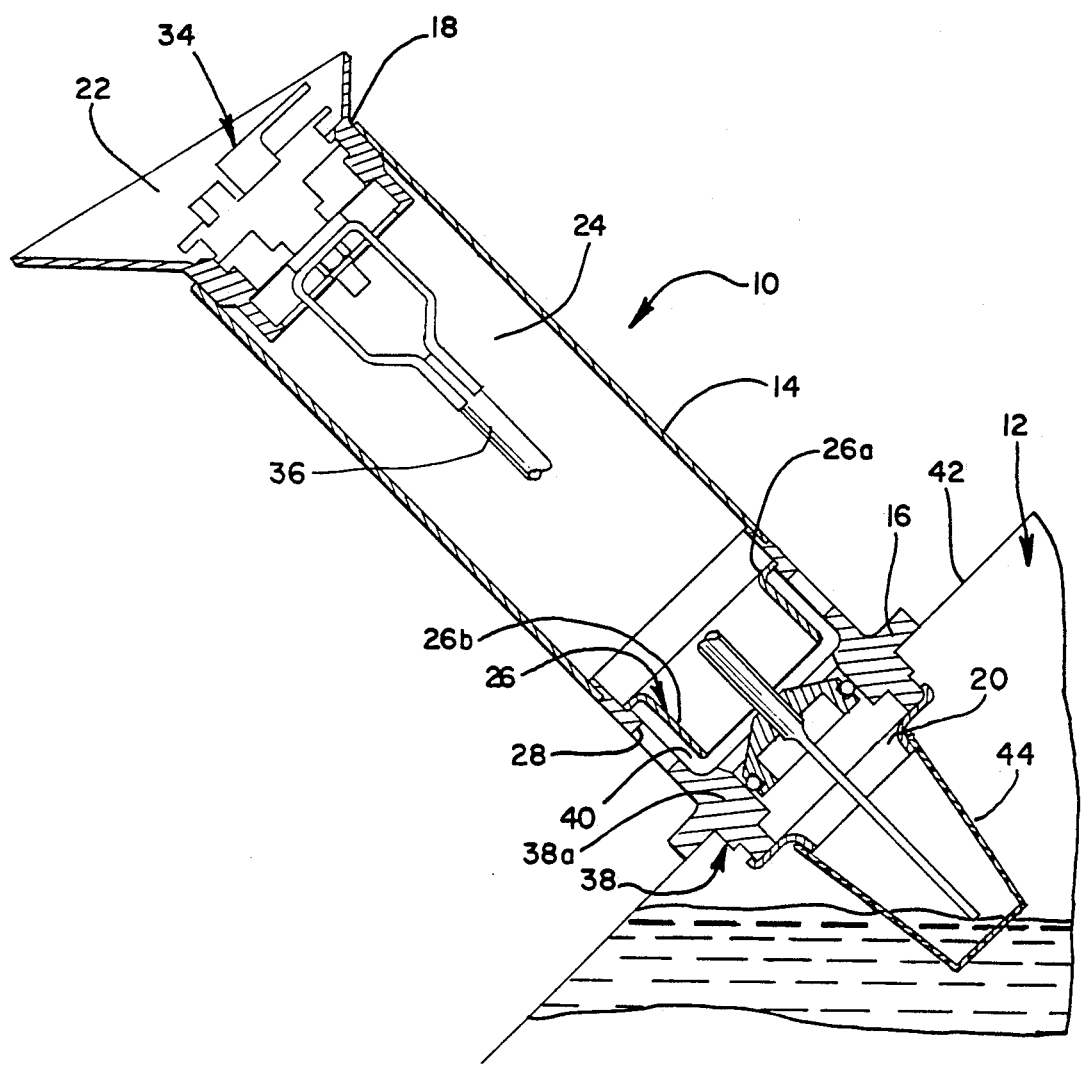
FIG. 1 is a cross-sectional view illustrating a filler pipe assembly in accordance with the present invention.

Referring to the drawings, and first to FIG. 1, the reference numeral 10 designates generally a filler pipe assembly for a liquid containing reservoir 12 in accordance with the present invention. The assembly 10 includes an elongated filler pipe 14 having one end 16 integral with the liquid containing reservoir 12 and the other end 18 positioned remote from the liquid containing reservoir 12. The elongated filler pipe 14 has a liquid-supplying opening 20 at the end 16 thereof integral with the liquid containing reservoir 12 and a liquid-receiving opening 22 at the end 18 thereof remote from the liquid containing reservoir 12. It also includes a substantially uninterrupted liquid passageway 24 extending between the liquid-receiving opening 22 and the liquid-supplying opening 20. The elongated filler pipe 14 is adapted to receive liquid in the liquid-receiving opening 22 and direct liquid along the liquid passageway 24 and into the liquid containing reservoir 12 as it exits through the liquid-supplying opening 20. In addition, the filler pipe assembly 10 includes a one-way barrier generally designated 26 which is formed relative to an overfill opening 28 in the elongated filler pipe 14 at a point remote from the liquid-receiving opening 22.

More specifically, the one-way barrier 26 is adapted to direct liquid introduced at the liquid-receiving opening 22 past the overfill opening 28 and into the liquid containing reservoir 12 (see FIG. 2). It does this while allowing liquid in the liquid containing reservoir 12 to escape through the overfill opening 28 in the event of introduction of liquid in a quantity sufficient to reach the overfill opening 28 in an overfill condition (see FIG. 3). As shown, the elongated filler pipe 14 is generally tubular shaped and disposed in an inclined plane such that the overfill opening 28 is disposed at a lowermost point along the liquid passageway 24 adjacent the liquid-supplying opening 20.

As shown in all of FIGS. 1 through 3, the one-way barrier 26 comprises an internal flange integral with the elongated filler pipe 14. The internal flange 26 directs liquid introduced into the liquid-receiving opening 22 over the overfill opening 28 as at 30. (see FIG. 2), and it includes a radially inwardly extending portion 26a above the overfill opening 28 which preferably extends inwardly a short distance but substantially entirely about the liquid passageway 24. As will be seen, the internal flange 26 includes a skirt portion 26b depending from the radially extending portion 26a.

In this connection, the skirt portion 26b of the internal flange 26 also preferably extends substantially entirely about the liquid passageway 24. It will further be appreciated that the skirt portion 26b extends to a point at or preferably below the overfill opening 28 so as to ensure that liquid introduced at the liquid-receiving opening 22 passes over the overfill opening 28 and into the liquid containing reservoir 12 at all times except in an overfill condition. As will be appreciated from FIGS. 1 through 3, the skirt portion 26b defines a reduced diameter region of the liquid passageway 24 for directing liquid into the liquid-supplying opening 20.

In a preferred embodiment, the filler pipe assembly 10 comprises an oil filler pipe and the liquid containing reservoir 12 comprises a gear box arrangement. It will be seen and appreciated by comparing FIGS. 2 and 3 that the one-way barrier 26 not only allows oil introduced at the oil-receiving opening 22 to be directed past the oil overfill opening 28 and into the gear box 12 but also allows oil in the gear box 12 to escape through the oil overfill opening 28 as at 32 (see FIG. 3) to indicate the introduction of oil in a quantity sufficient to reach the overfill opening at a maximum oil level for the gear box 12. In this manner, service personnel adding oil to the gear box 12 can visually detect when the gear box 12 is at the desired maximum oil level, i.e., when oil is escaping through the overfill opening 28.

Referring once again to FIG. 1, the oil filler pipe 10 preferably includes a cap generally designated 34 which is removably securable to the elongated filler pipe 14 at the oil-receiving opening 22. This cap 34 may be part of an assembly which includes a dipstick 36 in conventional fashion for checking the oil level in the gear box 12 to determine when it has dropped to a point sufficiently below the maximum level that oil should be added. However, because of the uniqueness of the oil overfill opening 28, there is no need to repeatedly recheck the level of oil with the dipstick 36 when oil is added to the gear box 12.

As previously mentioned, the elongated filler pipe 14 includes a substantially uninterrupted oil filling passageway 24 extending between the oil-receiving opening 22 and the oil-supplying opening 20. The oil overfill opening 28 and the one-way barrier 26 associated therewith comprise essentially the only interruption along the length of the generally tubular elongated filler pipe 14, and they are disposed at a lowermost point along the oil filling passageway 24 adjacent the oil-supplying opening 20. However, while the internal flange 26 defines a reduced diameter region of the oil filling passageway 24, it is such as to ensure that oil is directed past the overfill opening 28 and into the gear box 12 except in an overfill condition.

More specifically, it will be seen that the elongated filler pipe 14 has a radially inwardly and outwardly projecting flange 38 at the end 16 thereof integral with the gear box 12. This serves not only to secure the elongated filler pipe 14 to the gear box 12 but also, with regard to the radially inwardly projecting portion 38a of the circumferentially extending flange 38, to define a substantially continuous reduced diameter portion of the oil filling passageway 24 in conjunction with the depending skirt portion 26b of the internal flange 26. With this arrangement, oil may escape through the oil overfill opening 28 along the tortuous path as at 40 between the radially inwardly projecting portion 38a of the circumferentially extending flange 38 and the depending skirt portion 26b only in an oil overfill condition.

In the illustrated embodiment, the gear box 12 has an inclined wall 42 and the oil filler pipe 10 is integral with the inclined wall 42 of the gear box 12. It will also be seen that the oil filler pipe 10 includes a portion 44 which is a screen to prevent foreign objects from contaminating the gear box. As will now be appreciated, the oil filler pipe 10 is well suited for accomplishing the intended objectives.

While in the foregoing there has been set forth a preferred embodiment of the invention, it is to be understood that the invention is only to be limited by the spirit and scope of the appended claims.

I claim;

1. A filler pipe assembly for a liquid containing reservoir, comprising:
    an elongated filler pipe having one end integral with said liquid containing reservoir and the other end remote from said liquid containing reservoir, said elongated filler pipe having a liquid-supplying opening at the end thereof integral with said liquid containing reservoir and a liquid-receiving opening at the end thereof remote from said liquid containing reservoir together with a liquid passageway extending therebetween, said elongated filler pipe being adapted to receive liquid in said liquid-receiving opening and direct liquid into said liquid containing reservoir;

said elongated filler pipe having a liquid overfill opening at a point remote from said liquid-receiving opening; and means forming a one-way barrier relative to said liquid overfill opening for directing liquid introduced at said liquid-receiving opening past said liquid overfill opening and into said liquid containing reservoir while allowing liquid in said liquid containing reservoir to escape through said liquid overfill opening in the event of introduction of liquid in a quantity sufficient to reach said liquid overfill opening in an overfill condition.

2. The filler pipe assembly as defined in claim 1 wherein said elongated filler pipe is generally tubular shaped and disposed in an inclined plane, said overfill opening being disposed at a lowermost point along said liquid passageway adjacent said liquid-supplying opening.

3. The filler pipe assembly as defined in claim 1 wherein said barrier means includes an internal flange integral with said elongated filler pipe, said internal flange directing liquid introduced into said liquid-receiving opening over said overfill opening.

4. The filler pipe assembly as defined in claim 3 wherein said internal flange includes a radially inwardly extending portion above said overfill opening, said radially inwardly extending portion of said internal flange extending substantially entirely about said liquid passageway.

5. The filler pipe assembly as defined in claim 4 wherein said internal flange includes a skirt portion depending from said radially extending portion, said skirt portion of said internal flange extending substantially entirely about said liquid passageway.

6. The filler pipe assembly as defined in claim 5 wherein said skirt portion of said internal flange extends to a point below said overfill opening, said skirt portion defining a reduced diameter region of said liquid passageway for directing liquid into said liquid-supplying opening.

7. The filler pipe assembly as defined in claim 1 including a cap removably securable to said elongated filler pipe at said liquid-receiving opening.

8. An oil filler pipe for a gear box, comprising:

an elongated filler pipe having one end integral with said gear box and the other end remote from said gear box, said elongated filler pipe having an oil-supplying opening at the end thereof integral with said gear box and an oil-receiving opening at the end thereof remote from said gear box together with an oil filling passageway therebetween, said elongated filler pipe being adapted to receive oil in said oil-receiving opening and direct oil into said gear box;

said elongated filler pipe having an oil overfill opening in said oil filling passageway at a point remote from said oil-receiving opening, said elongated filler pipe being generally tubular shaped and disposed in an inclined plane; and means forming a one-way barrier relative to said oil overfill opening for directing oil introduced at said oil-receiving opening past said oil overfill opening and into said gear box while allowing oil in said gear box to escape through said oil overfill opening to indicate the introduction of oil in a quantity sufficient to reach said overfill opening at a maximum oil level for said gear box;

said barrier means including an internal flange integral with said elongated filler pipe, said internal flange directing oil introduced into said oil-receiving opening over said oil overfill opening.

9. The oil filler pipe as defined in claim 8 wherein said internal flange includes a radially inwardly extending portion above said oil overfill opening, said radially inwardly extending portion of said internal flange extending substantially entirely about said oil passageway.

10. The oil filler pipe as defined in claim 9 wherein said internal flange includes a skirt portion depending from said radially extending portion, said skirt portion of said internal flange extending substantially entirely about said oil passageway.

11. The oil filler pipe as defined in claim 10 wherein said skirt portion of said internal flange extends to a point below said oil overfill opening, said skirt portion defining a reduced diameter region of said oil passageway for directing oil into said oil-supplying opening.

12. The oil filler pipe as defined in claim 8 including a cap removably securable to said elongated filler pipe at said oil-receiving opening.

13. An oil filler pipe for a gear box, comprising:

an elongated filler pipe having one end integral with said gear box and the other end remote from said gear box, said elongated filler pipe having an oil-supplying opening at the end thereof integral with said gear box and an oil-receiving opening at the end thereof remote from said gear box together with a substantially uninterrupted oil filling passageway extending therebetween, said elongated filler pipe being adapted to receive oil in said oil-receiving opening and direct oil into said gear box;

said elongated filler pipe having an oil overfill opening in said oil filling passageway at a point remote from said oil-receiving opening, said elongated filler pipe being generally tubular shaped and disposed in an inclined plane, said oil overfill opening being disposed at a lowermost point along said oil passageway adjacent said oil-supplying opening; and means forming a one-way barrier relative to said oil overfill opening for directing oil introduced at said oil-receiving opening past said oil overfill opening and into said gear box while allowing oil in said gear box to escape through said oil overfill opening to indicate the introduction of oil in a quantity sufficient to reach said overfill opening at a maximum oil level for said gear box;

said barrier means including an internal flange integral with said elongated filler pipe, said internal flange directing oil introduced into said oil-receiving opening over said oil overfill opening.

14. The oil filler pipe as defined in claim 13 wherein said internal flange includes a radially inwardly extending portion above said oil overfill opening, said radially inwardly extending portion of said internal flange extending substantially entirely about said oil passageway.

15. The oil filler pipe as defined in claim 14 wherein said internal flange includes a skirt portion depending from said radially extending portion, said skirt portion of said internal flange extending substantially entirely about said oil passageway.

16. The oil filler pipe as defined in claim 14 wherein said skirt portion of said internal flange extends to a point below said oil overfill opening, said skirt portion defining a reduced diameter region of said oil passageway for directing oil into said oil-supplying opening.

17. The oil filler pipe as defined in claim 13 including a cap removably securable to said elongated filler pipe at said oil-receiving opening.

18. The oil filler pipe as defined in claim 13 wherein said gear box has an inclined wall and said oil filler pipe is integral with said inclined wall of said gear box.

19. The oil filler pipe as defined in claim 13 wherein said oil-supplying opening includes a screen.

20. The filler pipe assembly as defined in claim 1 wherein said liquid overfill opening is positioned to allow liquid in said liquid containing reservoir to escape to a visually detectable location.

* * * * *